United States Patent

Kamata

[11] Patent Number: 5,349,410
[45] Date of Patent: Sep. 20, 1994

[54] LENS-FITTED PHOTOGRAPHIC FILM UNIT

[75] Inventor: Kazuo Kamata, Saitama, Japan

[73] Assignee: Fuji Photo Film Co., Ltd., Kanagawa, Japan

[21] Appl. No.: 70,604

[22] Filed: Jun. 4, 1993

[30] Foreign Application Priority Data

Jun. 4, 1992 [JP] Japan .................................. 4-144652

[51] Int. Cl.$^5$ ............................................. G03B 17/02
[52] U.S. Cl. ..................................................... 354/288
[58] Field of Search ......................................... 354/288

[56] References Cited

U.S. PATENT DOCUMENTS 5,126,775 6/1992 Nakai et al. ........................... 354/288

Primary Examiner—Michael L. Gellner
Assistant Examiner—Nicholas J. Tuccillo
Attorney, Agent, or Firm—Young & Thompson

[57] ABSTRACT

A lens-fitted photographic film unit has a main body, which incorporates a photo-taking mechanism, and is pre-loaded with unexposed photographic film at its rear. A rear cover covers the rear of the main body in light-tight fashion. The rear cover has a pair of hooks. A receiving hole is formed in the main body, in which the hooks are engaged so as to retain the rear cover on the main body unremovably. To separate the rear cover from the main body, a reversal-preventing claw having the receiving hole therein is broken away from the main body, whereby the claw having the receiving hole is retained on the hooks. This prevents used parts from becoming inadvertently mixed up with new parts when certain other parts of used film units are retrieved for reuse.

19 Claims, 5 Drawing Sheets

LENS-FITTED PHOTOGRAPHIC FILM UNIT

BACKGROUND OF THE INVENTION

1. Field of the Invention

The present invention relates to a lens-fitted photographic film unit, and more particularly to a photographic film unit in which parts that are disassembled are given distinguishing characteristics upon disassembly so as to prevent errors during reassembly.

2. The Known Prior Art

Lens-fitted photographic film units (hereinafter referred to as film units) are now on the market, e.g. under a trade name "Quick Snap" (manufactured by Fuji Photo Film Co., Ltd.), which are a single-use camera pre-loaded with photographic film. These film units make it possible to take pictures whenever desired without buying or carrying an expensive and heavy camera, and can take pictures of suitable quality at low cost.

A user who has purchased the film unit winds up the film frame by frame for each exposure. The film unit in its entirety is forwarded to a photo laboratory after the whole strip of the film is exposed. An operator at the laboratory unloads the exposed film from the film unit and subjects it to development and printing in accordance with conventional photographic processing techniques. The user receives photoprints and a negative film but does not receive the film housing of the film unit.

The film housing after processing has heretofore been destroyed and discarded as waste with consequent pollution of the environment, so that it is desirable to recycle the film housing after processing. There could be two ways of recycling the film housing: to reassemble reusable parts as withdrawn, and to remold and regenerate moldable parts.

To recycle film units, film housings as emptied of film by a photofinisher are sent to and disassembled by a manufacturer. Parts to be disengaged from the film unit are provided with hooks and holes adapted for easy disengagement by deformation of the hooks. The parts as withdrawn are inspected and reassembled and the reassembled unit is loaded with new, unexposed film. Such easy disassembly enables parts to be recycled at little expense. Reassembly enables manufacture of film units at less cost too.

However, there is a problem in the reuse of parts of film units, in that the parts as withdrawn are often somewhat damaged or worn after one or more times of being disassembled. The film comes into direct contact with a main body and a rear cover: the main body has an exposure aperture for forming a frame on the film and has a film roll chamber for containing a roll of the film; the rear cover has a film contact surface for pressing the film against the exposure aperture, in the manner of a pressure plate. When any of the exposure aperture, the roll chamber, and the film contact surface is scratched, contact with the scratched portion causes scratches on the film, and will degrade the quality of photoprints that will be made from the exposed film. It is therefore desirable, in recycling, not to reuse, but rather to regenerate such synthetic resin parts as the rear cover, by subjecting them to melting and remolding, in which they are melted to resin pellets and then remolded.

The all-resin parts as disassembled, however, include a front cover and the rear cover: the former can be reused as it is, but the latter must be regenerated before it can be reassembled. To reassemble film units requires steps of classification and handling different resin parts separately. Furthermore, the rear cover as disassembled tends to be indistinguishable from newly molded ones. If the used rear cover as disassembled should be accidentally mixed in with remolded rear covers, the used rear cover would be hardly discernible from unused rear covers and so as a practical matter would not be removed from the reassembling process.

OBJECTS OF THE INVENTION

In view of the foregoing problems, an object of the present invention is to provide a lens-fitted photographic film unit in which parts that are disassembled are rendered detectably different during disassembly so as to prevent errors upon reassembly.

Another object of the present invention is to provide a lens-fitted photographic film unit whose quality is prevented from being degraded despite reassembly.

SUMMARY OF THE INVENTION

In order to achieve the above and other objects and advantages of this invention, a lens-fitted photographic film unit according to the present invention includes at least first and second parts connected together, incorporates a photo-taking mechanism, and is pre-loaded with unexposed photographic film. A claw structure is formed on the first part for retaining the first part on the second part. A receiving portion is formed on the second part, and unreleasably retains the claw structure, the receiving portion being adapted to be broken away from the second part and to be retained on the claw structure upon separation of the first and second parts.

A rear cover to be remolded after disassembly can be classified with ease and handled separately from parts such as a front cover reusable as is. Furthermore, the rear cover as disassembled is readily distinguishable from new ones.

Even when an exposure aperture, a roll chamber, and a film contact surface are scratched, the relevant parts are melted and remolded to have no scratches, causing no scratches on the next film. The quality of photographs made from the exposed film, is prevented from being degraded.

The novel lens-fitted photographic film unit can have parts distinguishable upon disassembly and reassembly, and have a quality which has not been degraded despite reassembly.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
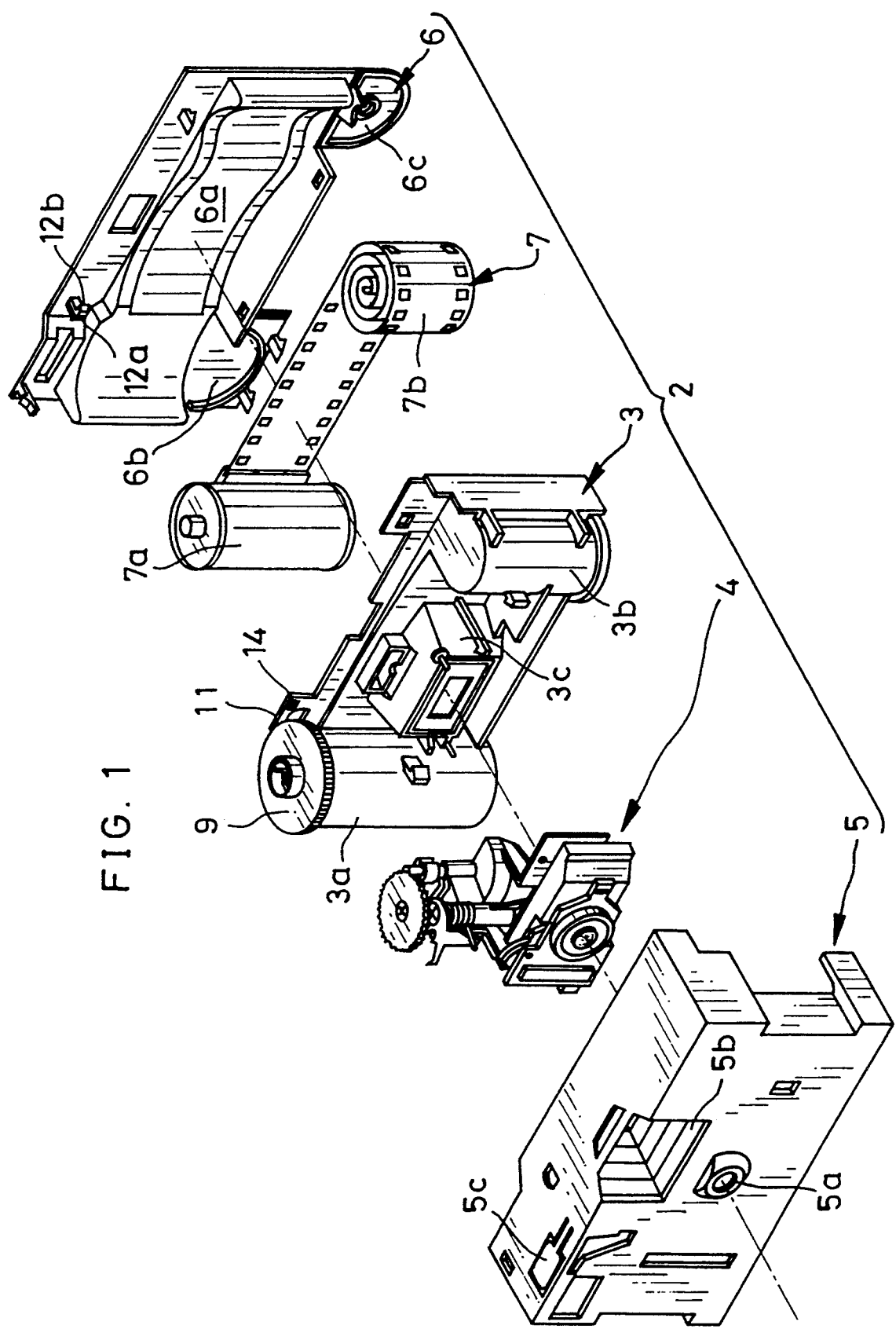
FIG. 1 is an exploded perspective view generally illustrating a novel lens-fitted photographic film unit according to the present invention.

A novel lens-fitted photographic film unit 2 consists of a film-containing section 3, a photo-taking section 4, front and rear covers 5 and 6 covering the sections 3 and 4, and photographic film with a cassette 7. The front cover 5 is provided with a lens aperture 5a, a finder objective window 5b and a shutter release button 5c.

The cassette 7 is constituted of a cassette shell 7a and the photographic film 7b which is 35 mm wide, is originally contained in the cassette shell 7a in light-tight fashion, and is drawn out and wound in a roll. The film-containing section 3 is formed of resin as one piece, and has a cassette chamber 3a for containing the cassette shell 7a, a roll chamber 3b for containing the roll of unexposed film 7b, and an exposure tunnel 3c with an exposure aperture to the rear.

Figure 2:
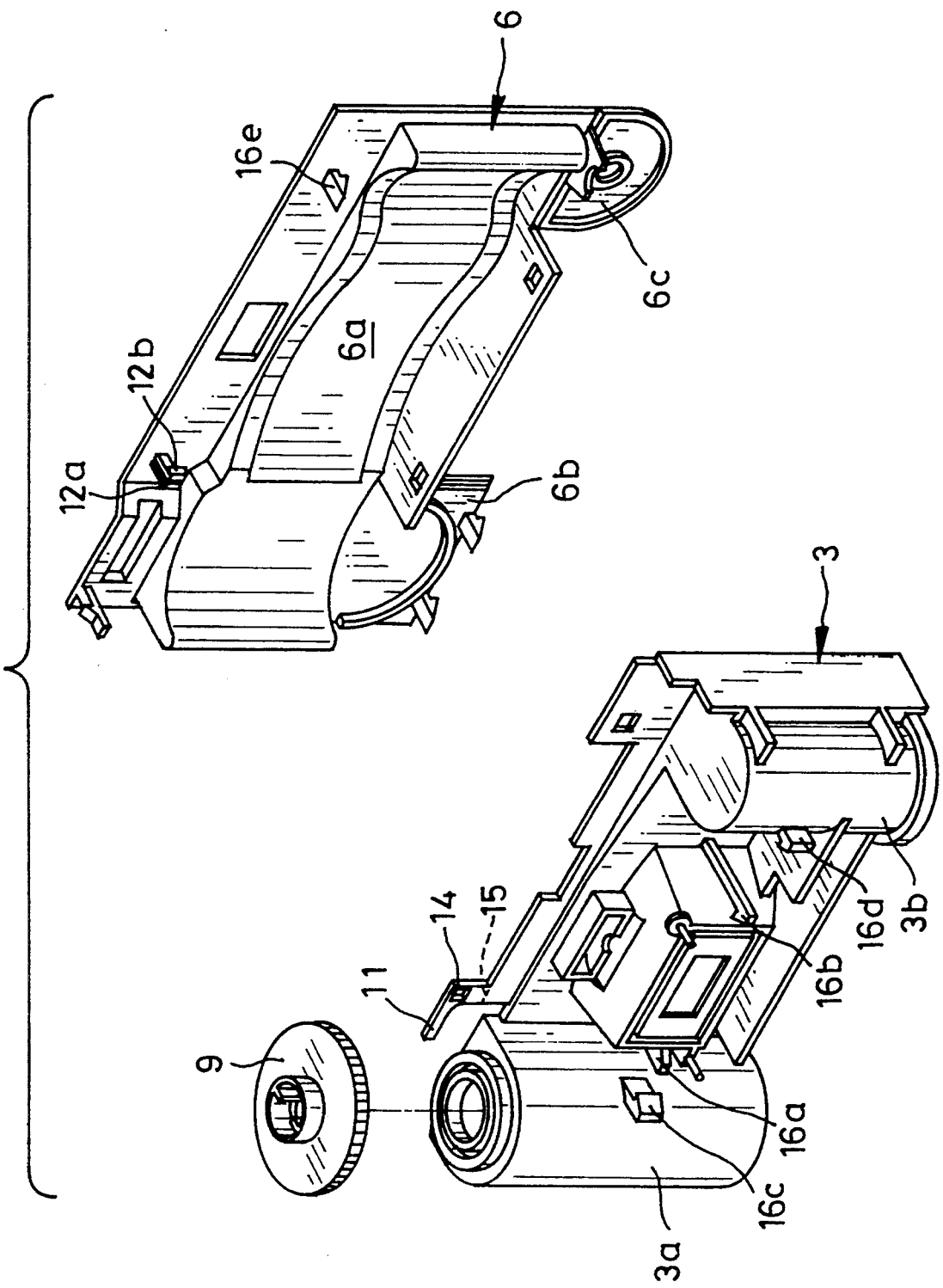
FIG. 2 is an exploded perspective view illustrating a film-containing section and a rear cover.
Figure 3:
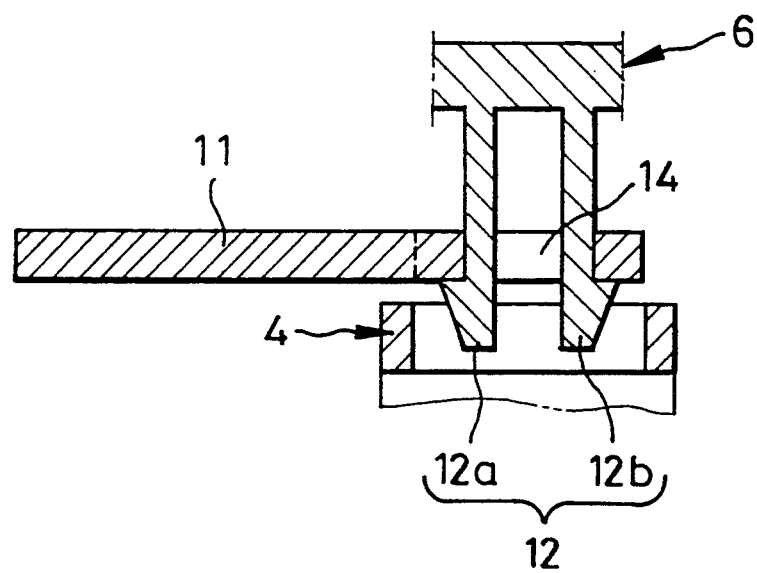
FIG. 3 is a cross section illustrating non-removable hooking claw structure and a claw with a receiving hole.

On the top of the cassette chamber 3a is arranged a wind-up wheel 9, of which the underside has a fork to engage with a spool in the cassette shell 7a. When rotated counter-clockwise, the wind-up wheel 9 rotates the spool to wind the film 7b back into the cassette shell 7a one frame at a time. Teeth are formed around the wind-up wheel 9, and are engaged with a reversal-preventing claw 11, which has resilience, is formed integrally with the film-containing section 3, allows the wind-up wheel 9 to rotate to wind up the film, and prevents the wheel 9 from rotating in reverse. In the claw 11 is formed a receiving hole 14, which, as described later, receives a claw structure 12 illustrated broadly in FIG. 2 and more particularly in FIG. 3. A groove 15 is formed in the film-containing section 3 at the base of the reversal-preventing claw 11, and has a V-shape as viewed in section in FIG. 4.

The rear cover 6 is formed of resin as one piece, is provided with a film contact surface 6a in opposition to the exposure aperture, and bottom lids 6b and 6c of a pull-top type for covering the bottom of the cassette chamber 3a and the film roll chamber 3b. The lid 6b, when opened, permits removal of the cassette shell 7a containing the exposed film 7b after taking photographs with the film unit. The claw structure 12 is formed on the rear cover 6, and consists of two retaining hooks 12a and 12b. When the rear cover 6 is attached to the film-containing section 3, the hooks 12a and 12b are inserted through the hole 14, are engaged with two opposite sides of the hole 14, and retain the rear cover 6 on the film-containing section 3.

Figure 4:
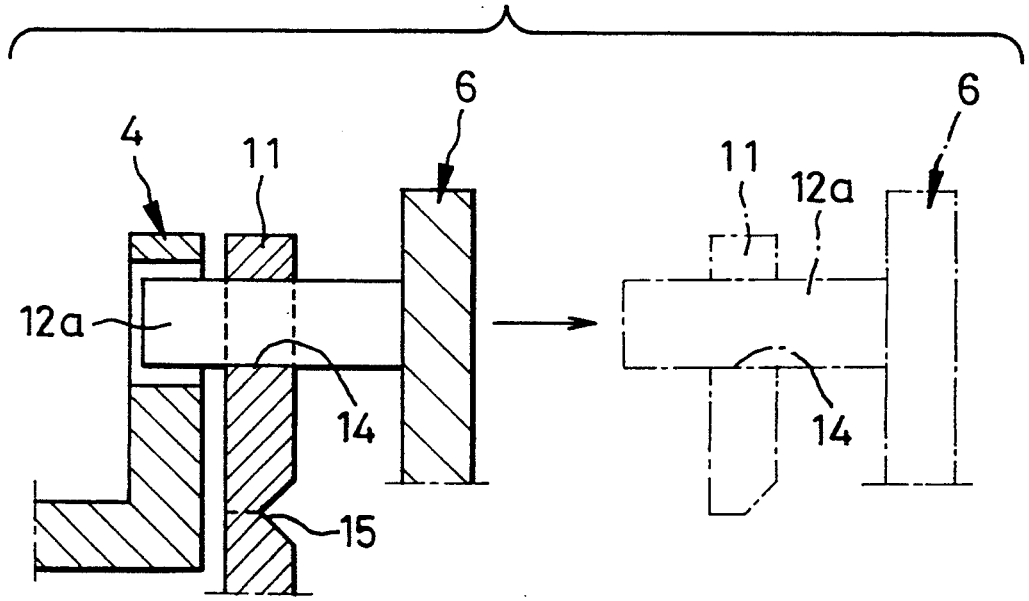
FIG. 4 is an explanatory view illustrating separation of the rear cover by breaking off the claw.

The photo-taking section 4 has a mechanism that undergoes a cycle of movement for each frame and a shutter mechanism, and includes a count-indicating wheel, a retaining lever, a shutter actuating lever, a shutter blade, and a driven sprocket wheel. The photo-taking section 4 is removably secured to the front of the film-containing section 3. As illustrated in FIG. 4, hooking portions of the hooks 12a and 12b that project through the hole 14 are closely surrounded by an opening or recess formed in the photo-taking section 4 secured to the film-containing section 3.

The operation of this construction will now be described. The film unit 2 that has been emptied of the film 7b and the cassette 7 by a photofinisher is returned to a manufacturer, where it is disassembled into the front cover 5, the photo-taking section 4, the film-containing section 3 and the rear cover 6. Separation between the sections 3 and 4 and between the film-containing section 3 and the front cover 5 is facilitated, because conventional deformable hooks that interconnect these are removable from associated holes when disassembling jigs are inserted to deform the hooks. Unlike these deformable hooks, however, the hooks 12 are undeformable even by the use of jigs. The film-containing section 3 is easily broken adjacent the hole 14, when the rear cover 6 is separated from the film-containing section 3, by breaking off the claw 11 along the groove 15. A conventional deformable hook is disengaged at the same time. After separation, the hooks 12a and 12b of the rear cover 6 still retain the claw 11, which has been broken away from the film-containing section 3.

Should a used rear cover 6 as disassembled be inadvertently mixed in with unused rear covers prepared for the reassembly process, the used rear cover 6 is easily distinguishable from the unused rear covers and can be removed from the reassembly process, because the broken bit of the claw 11 remains attached to the claw structure 12. The claw structure 12 with the broken claw 11 is also advantageous for preventing erroneous attachment to a new film-containing section, because the broken claw 11 abuts an unbroken reversal-preventing claw of the new photo-taking section.

Similarly, should the film-containing section 3 as disassembled be inadvertently mixed in with unused film-containing sections prepared for the reassembly process, the used film-containing section 3 is easily distinguishable from the unused film-containing sections, because the claw 11 is broken away from the film-containing section 3. This absence of the claw 11 is also advantageous, because, should the used film-containing section 3 be erroneously attached to a new rear cover, inspection after reassembly will detect that the wind-up wheel 9 is improperly rotatable in both directions.

After disassembly, the front cover 5 and the photo-taking section 4 are each inspected as to appearance and photo-taking performance, and then are introduced into the reassembly process. The disassembled film-containing section 3 and rear cover 6, by contrast, are subjected to a remolding step, in which they are melted and cast as resin pellets and remolded.

In the reassembly process, a used photo-taking section 4 after inspection is attached to a new film-containing section 3. The film-containing section 3 is loaded with a rolled unexposed film 7b and its cassette 7. The rear of this assembly is then covered with a new rear cover 6. The tapered hooking portions of the hooks 12, inserted through the hole 14, press against the edges of the hole 14, and are received in a hole in the photo-taking section 4, so that the hooks 12a and 12b are engaged with, and retain, the margins of the hole 14 without breaking hook 11 along the V-groove 15 until subsequent disassembly. Thus the sections 3 and 4 are reassembled into the main body, to which the front cover 5 is attached, to complete a film housing, which is checked as to performance, packaged, and shipped.

Figure 5:
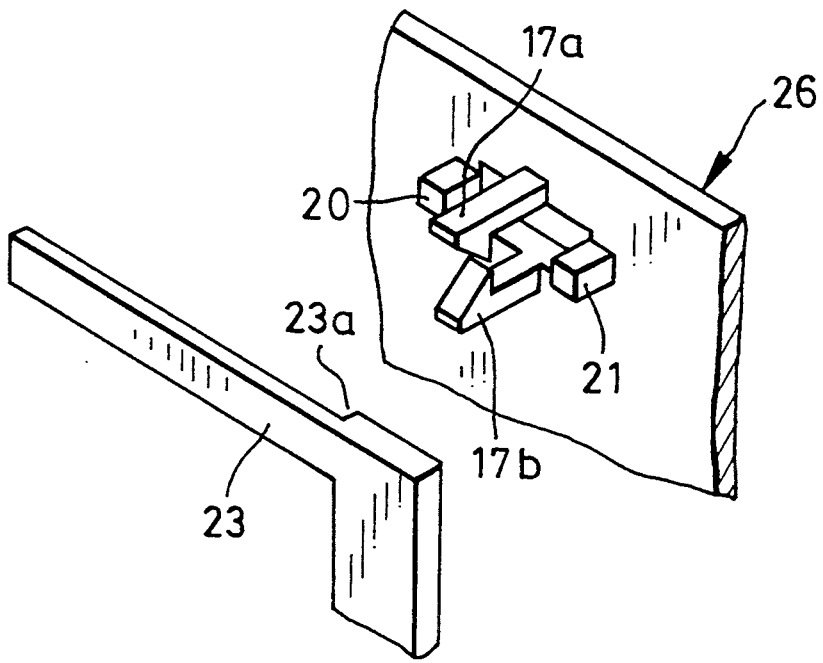
FIG. 5 is an exploded perspective view illustrating another preferred embodiment.
Figure 6:
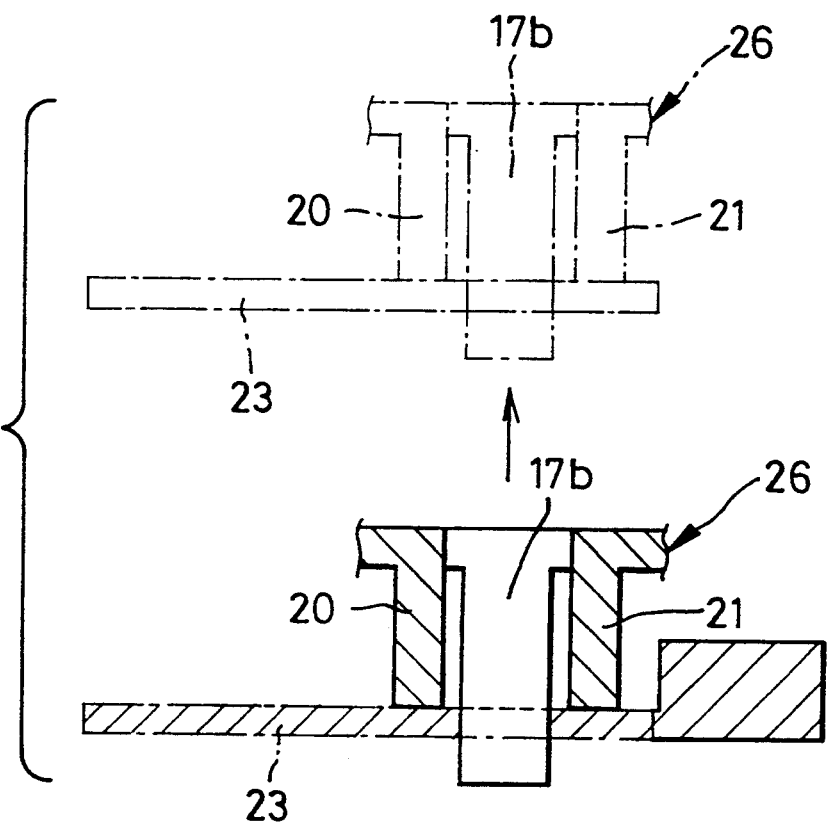
FIG. 6 is an explanatory view illustrating separation of a rear cover by breaking off a claw of FIG. 5.

According to the present invention, a novel lens-fitted photographic film unit can have other unreleasably hooking claw structure and receiving portions, such as illustrated in FIGS. 5 and 6. In these figures, retaining hooks 17a and 17b are engaged with a portion of a reversal-preventing claw 23. There are formed a pair of contact projections 20 and 21 arranged transversely of the hooks 17a and 17b. The projections 20 and 21 abut the claw 23 to help retain the claw 23 in engagement with the hooks 17a and 17b. Upon disassembly, the film-containing section is easily broken away, before a rear cover 26 is separated from the film-containing section, by breaking off the claw 23, which for this purpose is sufficiently thin to be readily broken.

Figure 7:
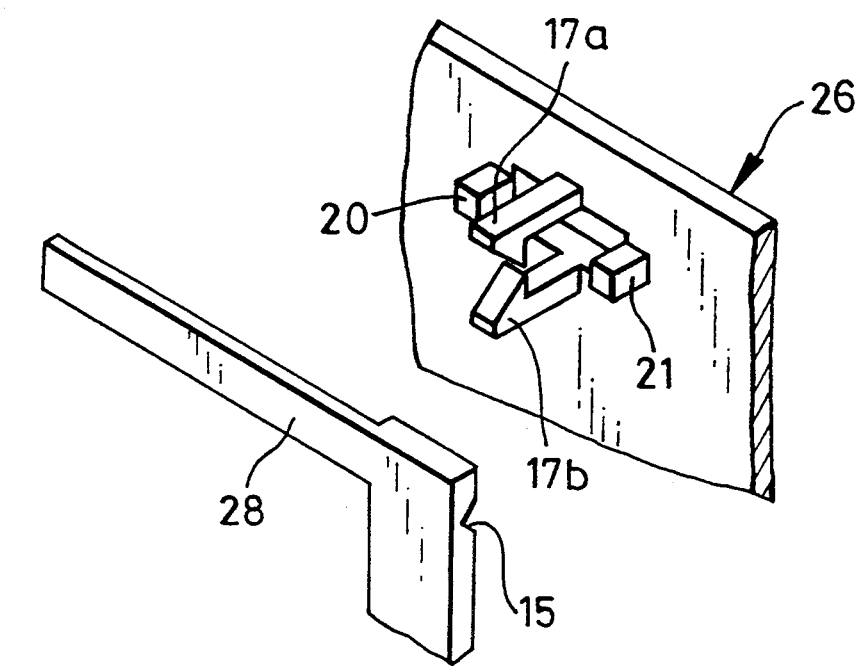
FIG. 7 is an exploded perspective view illustrating still another preferred embodiment.

Although the claw 23 is adapted to be broken along a step 23a as shown, there can instead be formed a V-groove 15 in a claw 28 as illustrated in FIG. 7. The claw 28 can thus be broken away horizontally along the groove 15, like the claw 11 in FIGS. 3 to 5.

The hooks 12a, 12b or 17a, 17b are formed on the rear cover 6 or 26, while the receiving hole 14 and the claw receiving portion are formed on the main body 3. Alternatively, the hooks can be formed on the main body, while the hole or portion for receiving the hooks can be formed on the rear cover.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A lens-fitted photographic film unit including at least first and second parts connected together, the film unit including a photo-taking mechanism and unexposed photographic film, the film unit further comprising:
    a claw structure formed on said first part for retaining said first part on said second part; and
    a receiving portion formed on said second part for receiving and unremovably retaining said claw structure, said receiving portion being readily broken away from said second part upon separation of said first and second parts and retained unremovably on said first part, thereby to provide on said first part the unremovably retained receiving portion as an indication that said first part has been used.

2. A lens-fitted photographic film unit as defined in claim 1, wherein said second part has a readily breakable portion near said receiving portion, the thickness of said readily breakable portion being such as to facilitate breakage of said receiving portion away from said second part.

3. A lens-fitted photographic film unit as defined in claim 1, wherein:
    said second part constitutes a main body incorporating said photo-taking mechanism and containing said unexposed film at the rear thereof; and
    said first part is a rear cover for covering a bottom and the rear of said main body in light-tight fashion.

4. A lens-fitted photographic film unit as defined in claim 3, further comprising a front cover removably secured to the front of said main body.

5. A lens-fitted photographic film unit as defined in claim 3, wherein:
    said main body includes a film-containing section of plastic and a photo-taking section secured in front of said film-containing section;
    said film-containing section contains said unexposed film and a cassette for taking up said film after exposure, and has said receiving portion formed thereon; and
    said photo-taking section includes said photo-taking mechanism.

6. A lens-fitted photographic film unit as defined in claim 5, wherein said photo-taking section is removably secured to said film-containing section.

7. A lens-fitted photographic film unit as defined in claim 5, wherein a wind-up wheel is rotatably mounted on said film-containing section for winding up said film.

8. A lens-fitted photographic film unit as defined in claim 7, wherein said receiving portion is a portion of a reversal-preventing claw which projects from said film-containing section in a shape of a thin plate for preventing said wind-up wheel from rotating in a direction opposite to the direction for winding up said film in said cassette.

9. A lens-fitted photographic film unit as defined in claim 8, wherein:
    said claw structure includes first and second retaining hooks that face each other; and
    said retaining hooks each have a portion projecting from said rear cover substantially erectly, and a hooking portion projecting laterally from an end of said projecting portion and engaging an edge of said reversal-preventing claw.

10. A lens-fitted photographic film unit as defined in claim 9, wherein said rear cover has a pair of contact projections disposed transversely of said first and second retaining hooks for clamping said reversal-preventing claw so as to keep said first and second hooking portions in contact with said reversal-preventing claw.

11. A lens-fitted photographic film unit as defined in claim 7, wherein:
    said receiving portion is a receiving hole formed in a reversal-preventing claw which projects from said film-containing section in the shape of a plate for preventing said wind-up wheel from rotating in a direction opposite to the direction winding up said film in said cassette; and
    said readily breakable portion is a groove formed between said receiving hole and said film-containing section.

12. A lens-fitted photographic film unit as defined in claim 11, wherein:
    said claw structure includes first and second retaining hooks arranged back to back; and
    said retaining hooks respectively have a portion projecting from said rear cover substantially erectly, and a hooking portion projecting laterally from an end of said projecting portion and engaging an edge of said receiving hole.

13. A lens-fitted photographic film unit as defined in claim 1, wherein:
    said first part constitutes a main body including said photo-taking mechanism and containing said unexposed film at its rear; and
    said second part is a rear cover for covering the bottom and rear of said main body in light-tight fashion.

14. A lens-fitted photographic film unit as defined in claim 13, further comprising a front cover removably secured to the front of said main body.

15. A lens-fitted photographic film unit including a photo-taking mechanism and unexposed photographic film, comprising:
    a main body carrying said photo-taking mechanism and containing said unexposed film at the rear thereof;

a plastic rear cover for covering the rear of said main body in light-tight fashion;

a claw structure formed on said rear cover for retaining said rear cover on said main body; and a receiving portion formed on said main body and unremovably retained on said claw structure, said receiving portion being readily broken away from said main body and retained on said claw structure upon separation of said rear cover from said main body, the receiving portion retained on said claw structure serving as an indication that said rear cover has been used.

16. A lens-fitted photographic film unit as defined in claim 15, wherein a wind-up wheel is rotatably mounted on said main body for winding up said film.

17. A lens-fitted photographic film unit as defined in claim 16, wherein said main body has a reversal-preventing claw for preventing said wind-up wheel from rotating in a direction opposite to the direction for winding up said film, and said receiving portion is formed on said reversal-preventing claw.

18. A lens-fitted photographic film unit including a photo-taking mechanism and unexposed photographic film, comprising:

a main body carrying said photo-taking mechanism and containing said unexposed film at the rear thereof;

a plastic rear cover for covering the rear of said main body in light-tight fashion;

a wind-up wheel rotatably mounted on said main body for winding up said film;

a reversal-preventing claw formed integrally with said main body and engaged with said wind-up wheel, for preventing said wind-up wheel from rotating in a direction opposite to a direction for winding up said film;

a retaining claw structure formed on said rear cover and engaged with said reversal-preventing claw, for retaining said rear cover on said main body;

the engagement between said retaining claw structure and said reversal-preventing claw being such that when said rear cover is removed from said main body, said reversal-preventing claw is disengaged from said wind-up wheel to allow reverse rotation of said wind-up wheel.

19. A lens-fitted photographic film unit as defined in claim 18, wherein said disengagement of said reversal preventing claw from said wind-up wheel is effected by said retaining claw breaking said reversal-preventing claw off of said main body.

* * * * *